(12) United States Patent
Felix (10) Patent No.: US 11,156,449 B2
(45) Date of Patent: Oct. 26, 2021

(54) SEPARATED BEAMS DISPLACEMENT MEASUREMENT WITH A GRATING

(71) Applicant: Keysight Technologies, Inc., Santa Rosa, CA (US)

(72) Inventor: Greg C. Felix, San Jose, CA (US)

(73) Assignee: Keysight Technologies, Inc., Santa Rosa, CA (US)

( * ) Notice: Subject to any disclaimer, the term of this patent is extended or adjusted under 35 U.S.C. 154(b) by 0 days.

(21) Appl. No.: 15/365,204

(22) Filed: Nov. 30, 2016

(65) Prior Publication Data

US 2017/0219334 A1 Aug. 3, 2017

Related U.S. Application Data

(60) Provisional application No. 62/289,307, filed on Jan. 31, 2016.

(51) Int. Cl.
*G01B 9/02* (2006.01)

(52) U.S. Cl.
CPC .......... *G01B 9/02058* (2013.01); *G01B 9/02* (2013.01); *G01B 9/02007* (2013.01); *G01B 9/02028* (2013.01); *G01B 2290/30* (2013.01); *G01B 2290/70* (2013.01)

(58) Field of Classification Search
CPC .. G01B 9/02058; G01B 9/02; G01B 9/02028; G01B 9/02007; G01B 2290/30; G01B 2290/70; G01D 5/38; G01D 5/347
See application file for complete search history.

(56) References Cited

U.S. PATENT DOCUMENTS

| | | | |
|---|---|---|---|
| 7,251,039 B1 | 7/2007 | Schluchter et al. | |
| 2009/0147265 A1* | 6/2009 | Klaver | G01D 5/38 356/488 |
| 2016/0102999 A1* | 4/2016 | Liesener | G01D 5/266 356/488 |

* cited by examiner

*Primary Examiner* — Hwa Andrew Lee (57) ABSTRACT

An interferometer has a first input configured to provide a first measurement beam at a first frequency, and a second measurement signal at the first frequency. The interferometer has a second input configured to provide a reference beam at a second frequency that is different than the first frequency; an optical element comprising a first portion comprising a polarization beam splitter; and a diffraction grating disposed over the optical element configured to diffract the first measurement beam and the second measurement beam.

5 Claims, 6 Drawing Sheets

SEPARATED BEAMS DISPLACEMENT MEASUREMENT WITH A GRATING

CROSS-REFERENCE TO RELATED APPLICATIONS

The present application claims priority under 35 U.S.C. § 119(e) to U.S. Provisional Application No. 62/289,307 filed on Jan. 31, 2016. The entire disclosure of U.S. Provisional Application No. 62/289,307 is specifically incorporated herein by reference.

BACKGROUND

Use of optical interferometry is known for precise measurement of small displacements and rotations using a beam of light split into reference and measurement beams. The measurement beam is reflected from a mirror mounted on a moving object and is combined with the reference beam reflected from a stationary object to generate a phase difference. The phase difference is proportional to the amount of displacement made between the reflector of the reference beam and the reflector of the measurement beam.

In certain known interferometers, polarization leakages will produce errors that interfere at periods not simply related to the stage displacement. These leakages can result in measurement inaccuracies.

What is needed, therefore, is an interferometer that overcomes at least the noted drawbacks of known interferometers referenced above.

BRIEF DESCRIPTION OF THE DRAWINGS

The example embodiments are best understood from the following detailed description when read with the accompanying drawing figures. It is emphasized that the various features are not necessarily drawn to scale. In fact, the dimensions may be arbitrarily increased or decreased for clarity of discussion. Wherever applicable and practical, like reference numerals refer to like elements.

FIG. 6 is a simplified schematic cross-sectional view of a null optical path of an interferometer in accordance with a representative embodiment.

DETAILED DESCRIPTION

In the following detailed description, for purposes of explanation and not limitation, example embodiments disclosing specific details are set forth in order to provide a thorough understanding of an embodiment according to the present teachings. However, it will be apparent to one having ordinary skill in the art having the benefit of the present disclosure that other embodiments according to the present teachings that depart from the specific details disclosed herein remain within the scope of the appended claims. Moreover, descriptions of well-known apparatuses and methods may be omitted so as to not obscure the description of the example embodiments. Such methods and apparatuses are clearly within the scope of the present teachings.

The terminology used herein is for purposes of describing particular embodiments only, and is not intended to be limiting. The defined terms are in addition to the technical and scientific meanings of the defined terms as commonly understood and accepted in the technical field of the present teachings.

Unless otherwise noted, when a first element (e.g., an optical fiber) is said to be connected to a second element (e.g., an optical element), this encompasses cases where one or more intermediate elements (e.g., another optical element) may be employed to connect the two elements to each other. However, when a first element is said to be directly connected to a second element, this encompasses only cases where the two elements are connected to each other without any intermediate or intervening devices. Similarly, when an optical signal is said to be coupled to an element, this encompasses cases where one or more intermediate elements may be employed to couple the optical signal to the element. However, when an optical signal is said to be directly coupled to an element, this encompasses only cases where the optical signal is directly coupled to the element without any intermediate or intervening devices.

As used in the specification and appended claims, the terms 'a', 'an' and 'the' include both singular and plural referents, unless the context clearly dictates otherwise. Thus, for example, 'a device' includes one device and plural devices. As used in the specification and appended claims, and in addition to their ordinary meanings, the terms 'substantial' or 'substantially' mean to within acceptable limits or degree. As used in the specification and the appended claims and in addition to its ordinary meaning, the term 'approximately' means to within an acceptable limit or amount to one having ordinary skill in the art. For example, 'approximately the same' means that one of ordinary skill in the art would consider the items being compared to be the same.

Relative terms, such as "above," "below," "top," "bottom," may be used to describe the various elements' relationships to one another, as illustrated in the accompanying drawings. These relative terms are intended to encompass different orientations of the elements thereof in addition to the orientation depicted in the drawings. For example, if an apparatus (e.g., a optical element) depicted in a drawing were inverted with respect to the view in the drawings, an element described as "above" another element, for example, would now be "below" that element. Similarly, if the apparatus were rotated by 90° with respect to the view in the drawings, an element described "above" or "below" another element would now be "adjacent" to the other element; where "adjacent" means either abutting the other element, or having one or more layers, materials, structures, etc., between the elements.

In accordance with a representative embodiment, an apparatus comprises: a first input configured to provide a first measurement beam at a first frequency, and a second measurement signal at the first frequency; a second input configured to provide a reference beam at a second frequency that is different than the first frequency; an optical element comprising a first portion comprising a polarization beam splitter, a diffraction grating disposed over the optical element configured to diffract the first measurement beam and the second measurement beam; and a first optical retarder configured to rotate a polarization axis of the first optical beam by approximately 90°; and a second optical retarder configured to rotate a polarization axis of the second optical beam by approximately 90°.

Figure 1:
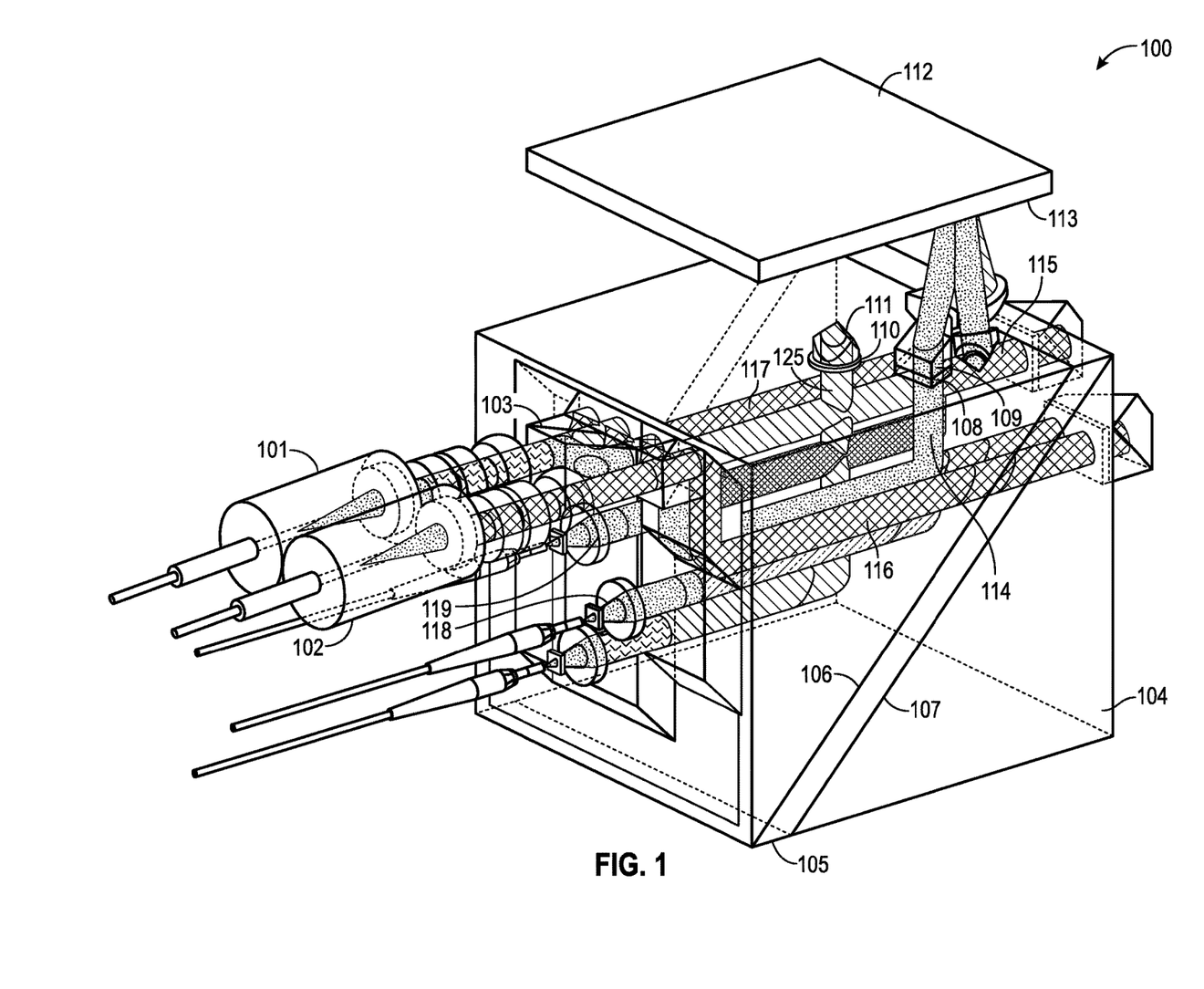
FIG. 1 is a perspective view of an interferometer in accordance with a representative embodiment.

Turning to FIG. 1, an apparatus 100 according to a representative embodiment is depicted. The apparatus 100 comprises a first optical input 101 and a second optical input 102. The first and second optical inputs 101, 102 are configured to receive, for example, respective optical fibers or free optical beams. The apparatus 100 further comprises input optics 103 configured to direct the optical signals from the various optical beams from the first and second optical inputs 101, 102 to desired paths in the apparatus.

The apparatus 100 comprises an optical device 104, which comprises an optical element 105 disposed therein. As described more fully herein, a polarization beam splitter (PBS) is disposed along a selected portion of a first surface 106 of the optical element 105; and a beam bender is disposed along a selected portion of a second surface 107 of the optical element 105. As depicted, the optical element 105 is oriented along a diagonal to the optical device 104 to foster 90° reflections by the PBS and beam bender as described more fully below.

As better depicted in other drawings below, a first optical retarder 108 is disposed under a first directional element 109, and a second directional element 111 is disposed over a second optical retarder 110. The first and second optical retarders 108, 110, are illustratively quarter-wave plates, and are disposed over an upper surface of the optical device 104. Other similar components not readily seen in FIG. 1 are also components of the apparatus, and are described below.

A diffraction element 112 is disposed above the upper surface of the optical device 104 as shown. A diffraction grating (not shown in FIG. 1) is disposed over a lower surface 113 of the diffraction element 112. The diffraction grating serves as the measurement reflector, the function of which is known to one of ordinary skill in the art of interferometric displacement measurement devices.

As described more fully below, the first and second optical inputs 101, 102, provide a first measurement beam 114, a second measurement beam 115, a first reference beam 116, and as second reference beam 117. Specifically, the first input 101 is split into first, second and third measurement beams 114, 115, and 125; and second input 102 is split into first, second and third reference beams 116, 117, 325. The first, second and third measurement beams 114, 115 have first frequency $f_1$. By contrast, the first, second and third reference beams 116, 117 have second frequency $f_2$, which is different from the first frequency $f_1$. As will be appreciated by one of ordinary skill in the art, using two frequencies enables heterodyne measurement to be effected. As also described more fully below, the first and second measurement beams 114, 115 enable the determination of displacement in along two coordinate axes. By way of example, the first and second measurement beams 114, 115 can be used to determine displacement in the x direction, and z direction. In this embodiment the coordinate system is rotated at a 45 degree angle in the plane of the grating. By application of the present teachings, multiple axes can be measured to measure more displacement directions like xz and yz. Multiple axes of measurement in similar axes at an offset measurement location can be used to measure one or more rotations.

Notably, the third measurement beam 125, sometimes referred to as the null reference beam, and the third reference beam 325 (see FIG. 3) are provided. The third measurement beam 125 is incident on the first surface 106 at a portion comprising a PBS, which reflects the third measurement beam 125 toward the second optical retarder 110. The third measurement beam 125 is traverses the second optical retarder 110, and is reflected back along/parallel to its path by the second directional element 111, which may be a cube corner. The third measurement beam 125 traverses the second optical retarder 110 as second time, and illustratively has is polarization axis rotated by approximately 90° relative to its original polarization state. The third measurement beam 125 then traverses the PBS at the first surface and is reflected at the second surface 107, by a beam bender or other reflective surface. Notably, the null measurement beam 125 can be used for calibration of the apparatus 100.

As described more fully below, a first output beam 118 and a second output beam are provided. The first output beam 118 combines the outputs of the first measurement beam 114 and the first reference beam 116 after traversing optical paths of the apparatus 100 as described below; and the second output beam 119 combines the outputs of the second measurement beam 115 and the second reference beam 117 after traversing optical paths of the apparatus 100 as described below. The first and second output beams 118, 119 are then used to determine displacement in the x and z directions.

Figure 2:
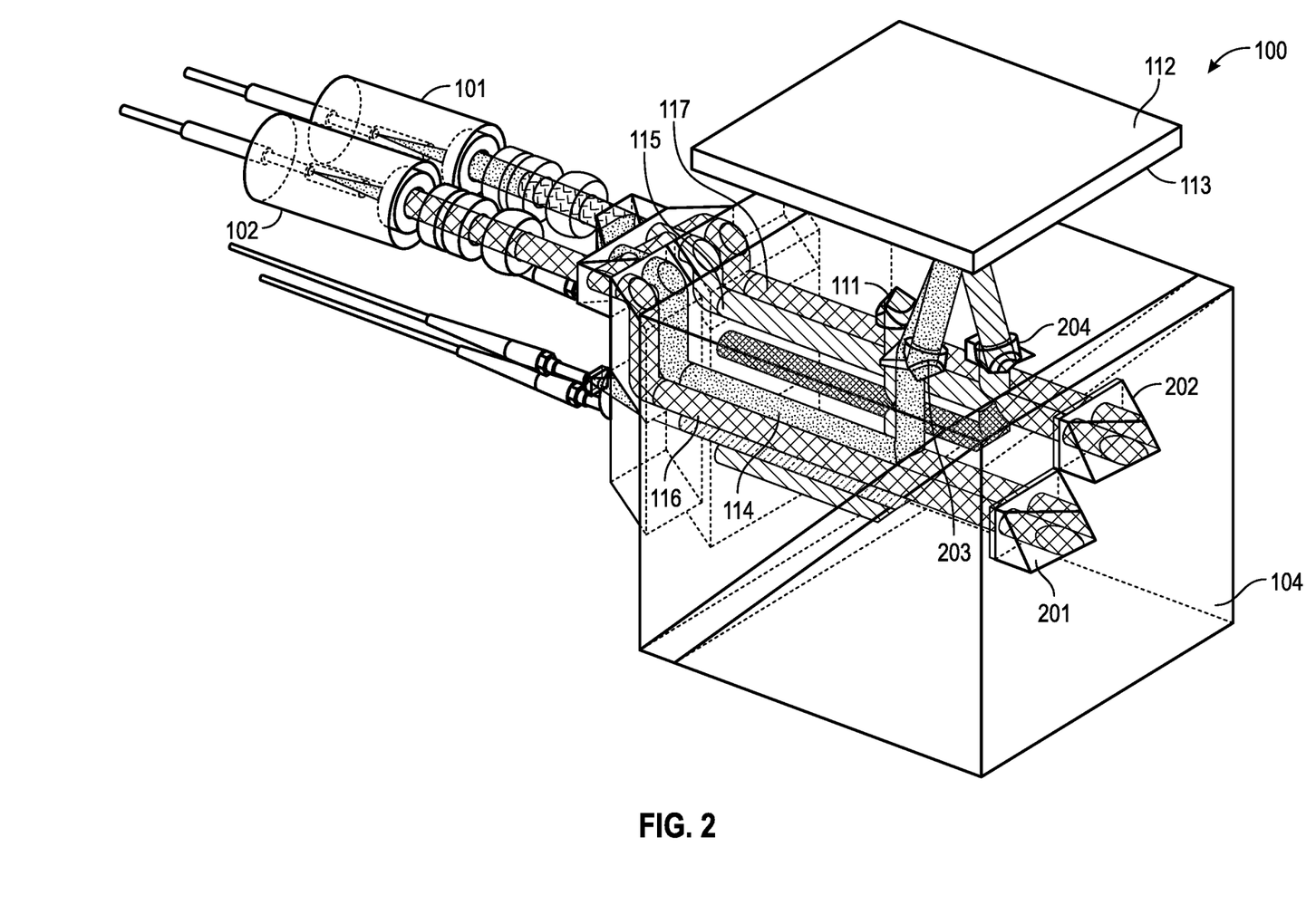
FIG. 2 is another perspective view of the interferometer of the representative embodiment of FIG. 1.

FIG. 2 is another perspective view of the apparatus 100 of the representative embodiment of FIG. 1. All aspects and details of the apparatus 100 as described in connection with FIG. 1 are substantively identical, and are generally not repeated in the description of FIG. 2.

The apparatus 100 comprises a first cube corner 201 and a second cube corner 202 disposed on a surface opposing the surface to which the first optical input 101 and second optical input 102 are disposed. The first and second cube corners 201, 202 are, for example, known to one of ordinary skill in the art for returning an input optical beam along the same path or along a parallel return path as its incident path. Notably, and as described more fully below, the second directional element 111 is, illustratively, a cube corner.

The apparatus 100 comprises a third cube corner 203 and a fourth cube corner 204, which are disposed between the upper surface of the optical device 104 and the diffraction element 112. The third cube corner 203 directs the first measurement beam 114, and the fourth cube corner 204 directs the second measurement beam 115 as described below.

As better seen in FIG. 2, the input optics 103 directs light from the first optical input 101 to separate the input beam into the first measurement beam 114, and the second measurement beam 115 as depicted, translated from the input and from one another. Similarly, the input optics 103 directs light from the second optical input 102 to provide the first reference beam 116 so as to be incident on the first cube corner 201; and so the second measurement beam 115 is incident on the second cube corner 202. As also described more fully below, optical retarders (not shown in FIG. 2) are disposed between the first and second cube corners 201, 202. Illustratively, the optical retarders are also quarter-wave plates.

Figure 3:
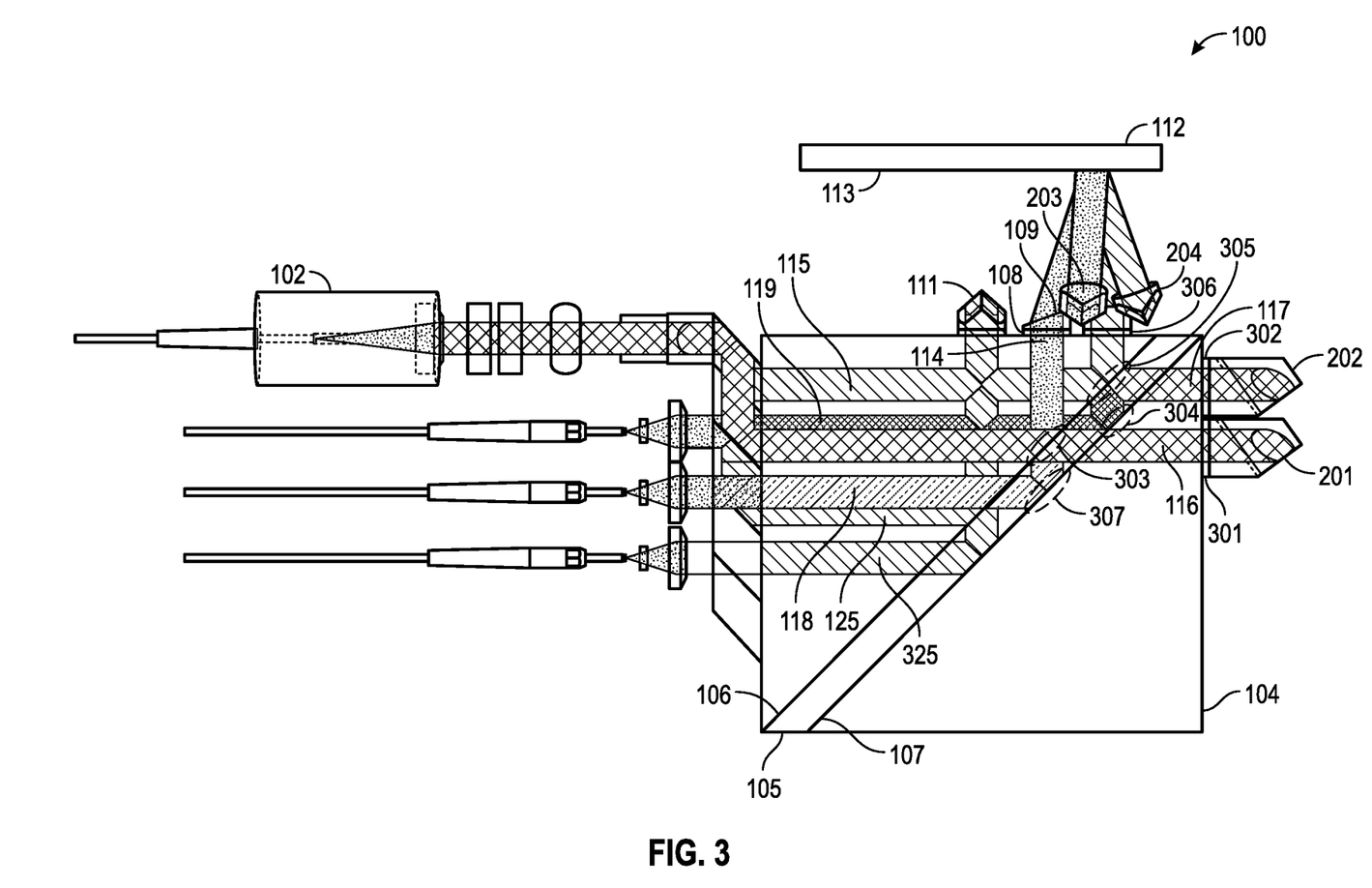
FIG. 3 is a cross-sectional view of the interferometer of the representative embodiment of FIG. 1.

FIG. 3 is a cross-sectional view of the interferometer of the representative embodiment of FIG. 1. All aspects and details of the apparatus 100 as described in connection with FIGS. 1 and 2 are substantively identical, and are generally not repeated in the description of FIG. 3.

As depicted in FIG. 3, a third optical retarder 301 is disposed between the optical device 104 and the first cube corner 201, and a fourth optical retarder 302 is disposed between the optical device 104 and the second cube corner. The third and fourth optical retarders 301, 302, are illustratively quarter-wave plates. As described below, the third and fourth optical retarders 301, 302 can be foregone in certain embodiments.

In operation, the first measurement beam 114 is incident on a first portion 303 of the first surface 106. This first portion 303 comprises a polarization beam splitter (PBS) provided thereover or formed thereon. The first measurement beam 114 has a first polarization and is reflected by the PBS at first portion 303. The first reference beam 116 may have the first polarization state as well, but is not incident on the first portion 303, but rather is incident on a portion (not shown) of the first surface 106 that does not include a PBS. The first reference beam 116 is transmitted through the optical element 105. By contrast, if the first surface 106 has a PBS located at the point of incidence (e.g., at first portion 303) of the first reference beam 116, the first reference beam 116 would have a second polarization, which is substantially orthogonal to the first polarization. As such, the first reference beam 116 would be transmitted substantially unreflected at the PBS of the first portion 303.

Upon reflection at the first portion 303, the first measurement beam 114 is incident on the first optical retarder 108, where it undergoes a quarter-wave ($\lambda/4$) rotation, and is directed toward the diffraction element 112 by the first directional element 109, which is a prism or other suitable geometric optical element that causes a change in direction of the first measurement beam 114 toward the diffraction element 112. Upon diffraction in plane of the grating direction and with an offset normal to the grating direction, the first measurement beam 114 is incident on the third cube corner 203, and returned along its incident path to the diffraction grating, through the first directional element 109, and again through the first optical retarder 108, where it undergoes another quarter-wave rotation. Upon incidence again on the PBS at first portion 303, the first measurement beam 114 has a polarization state rotated by 90° from its incident state. As such, the first measurement beam 114 is substantially unreflected at first portion 303 and travels through the optical element 105, and is incident on a second portion 307 of the second surface 107. The second portion 307 has a beam bender formed on or otherwise disposed thereon. The beam bender is, for example, a highly reflective (HR) coating within the purview of one of ordinary skill in the art. Upon incidence at the second portion 307, the first measurement beam is reflected towards the output.

The first reference beam 116 is transmitted substantially unreflected at the PBS of the first portion 303. The first reference beam 116 may be in the first polarization state, or the second polarization state. If the first reference beam 116 is in the first polarization state, the third optical retarder 301 is not needed, and the first reference beam 116 is reflected offset by the first cube corner 201, but parallel to its incident path by the first cube corner 201. The first reference beam 116 is then incident on the optical element 105 at a beam bender or other reflective element where it is reflected to the second surface 107 (e.g., at second portion 307), where it is again reflected to be combined with the first measurement beam to provide the first output beam 118. By contrast, if the first reference beam has the second polarization state, traversing the third optical retarder 301 twice results in a polarization rotation of 90° from its incident state. As such, the first reference beam 116 has the first polarization state. Upon incidence at first portion 303, the PBS reflects the reference beam to second portion 307, where it is again reflected, and is combined with the first measurement beam to provide the first output beam 118. Incident areas on first and surfaces 106 and 107 are different for input beams originating from 101 and 102 since the beams are spatially separated in and out of the page per FIG. 3. Therefore a coated area for one in this view does not imply the same coating for the other (e.g., 304, 305, 306, 307)

Similarly, the second measurement beam 115 is incident on third portion 305 of the first surface 106. This third portion 305 comprises a polarization beam splitter (PBS) provided thereover or formed thereon. The second measurement beam 115 has the first polarization and is reflected by the PBS at third portion 305.

Upon reflection at the third portion 305, the second measurement beam 115 is incident on a fifth optical retarder 306 disposed between the upper surface of the optical device 104 and a third directional element (not shown in FIG. 3). The second measurement beam 115 undergoes a quarter-wave ($\lambda/4$) rotation at the fifth optical retarder, and is directed toward the diffraction grating at or near the Littrow angle in the plane of the grating direction and offset normal to the grating direction by the third directional element. Stated somewhat differently, the second measurement beam 115 undergoes first order diffraction from the diffraction grating toward the fourth cube corner 204. As such, from the diffraction grating, the second measurement beam 115 is incident on the fourth cube corner 204, and returned along its incident path to the diffraction grating, through the third directional element, and again through the fifth optical retarder 306, where it undergoes another quarter-wave rotation. Upon incidence again on the PBS at third portion 305, the second measurement beam 115 has a polarization state rotated by 90° from its incident state. As such, the second measurement beam 115 is substantially unreflected at third portion 305 and travels through the optical element 105, and is incident on a second portion 304 of the second surface 107. The fourth portion 307 has a beam bender formed on or otherwise disposed thereon. As before, the beam bender is, for example, a highly reflective (HR) coating within the purview of one of ordinary skill in the art. Upon incidence at the fourth portion 307, the second measurement beam 115 is reflected towards the output at 119.

Like first reference beam 116, the second reference beam 117 may be the first polarization state, or the second polarization state. If the second reference beam 117 is the first polarization state, the fourth optical retarder 302 is not needed, and the second reference beam 117 is reflected offset, but parallel to its incident path by the second cube corner 202. The second reference beam 117 is then incident on the optical element 105 where it is reflected to the PBS surface 106 (e.g., at third portion 305), where it is again reflected to be combined with the second measurement beam 115 to provide the second output beam 119 after reflecting at second portion 304 of second surface 107. By contrast, if the second reference beam 117 has the second polarization state, which is substantially orthogonal to the first polarization, the second reference beam 117 is transmitted substantially unreflected at the PBS of the third portion 305. The second reference beam 117 traverses the fourth optical retarder 302, and is reflected offset, but parallel to its incident path by the second cube corner 202. Traversing the fourth optical retarder 302 twice results in a polarization rotation of 90° from its incident state. As such, the second reference beam 117 has the first polarization state. Upon incidence at third portion 305, the PBS reflects the reference beam to fourth portion 307, where it is again reflected, and is combined with the second measurement beam 115 to provide the second output beam 119 after reflecting at 304 region of 107.

Figure 4:
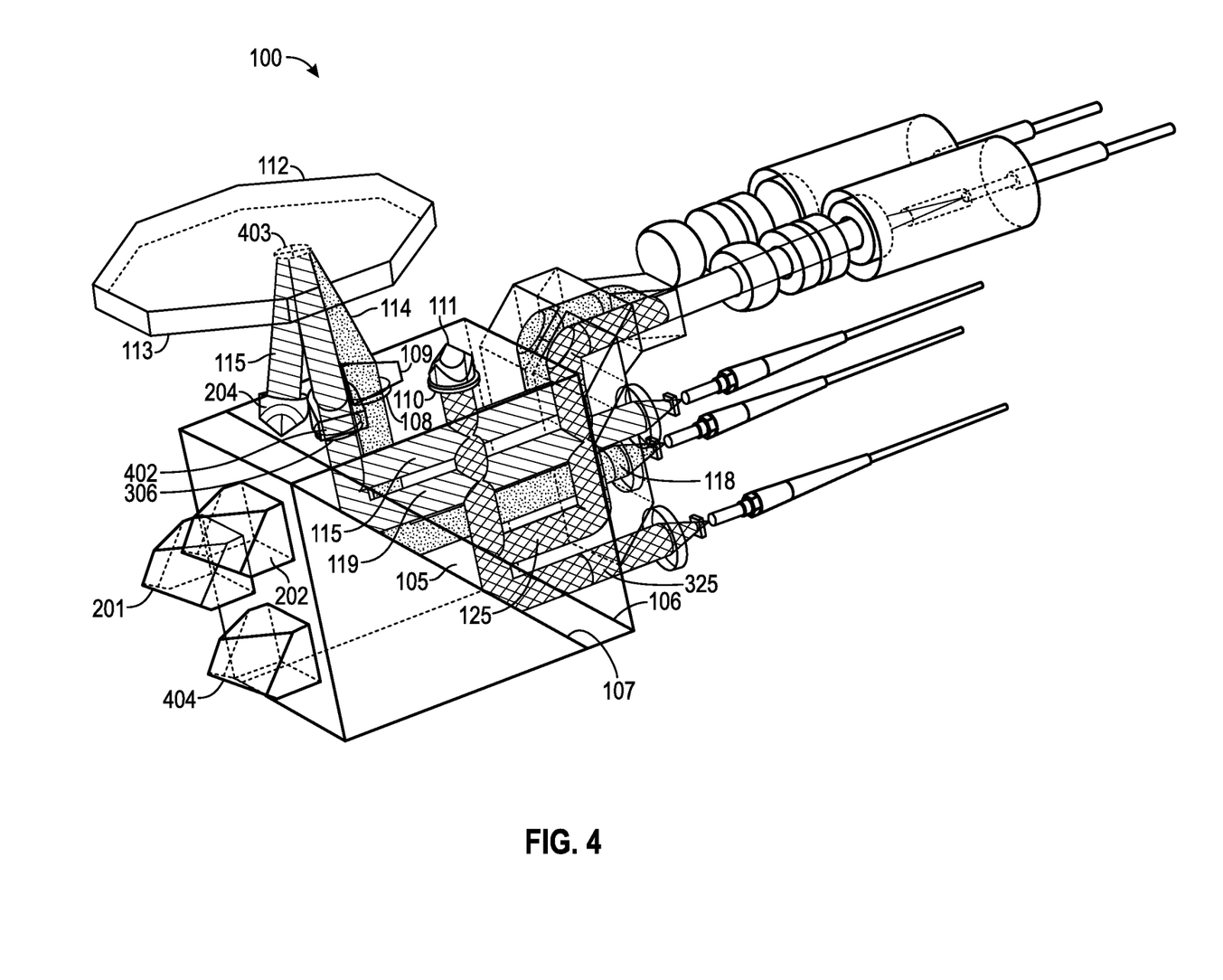
FIG. 4 is another perspective view of the interferometer of the representative embodiment of FIG. 1.

FIG. 4 is a perspective view of the interferometer of the representative embodiment of FIG. 1. All aspects and details of the apparatus 100 as described in connection with FIGS. 1, 2 and 3 are substantively identical, and are generally not repeated in the description of FIG. 4.

The apparatus 100 of the representative embodiment depicted in FIG. 4 shows the optical paths of the first, second and third measurement beams 114, 115, and 125, and the first, second and third output beams, 118, 119, and 325, respectively. Notably, the reference beams described above (and below) are not depicted in order to provide a clearer view of the paths of the various measurement and output beams. Notably, a sixth optical retarder 306 can be seen, and is disposed over the upper surface of the optical device 104, and between the optical device 104, and a fourth directional element 402. As described above, the second measurement beam 115 traverses the sixth optical retarder 306, and is directed to a diffraction grating 403 (same function as 112), where it is diffracted to the fourth cube corner 204 as described above. The sixth optical retarder 306 is a quarter-wave plate, for example, and usefully alters the polarization state of the second measurement beam 115 to enable its travel through the apparatus 100 in accordance with representative embodiments described above.

The apparatus 100 also comprises a fifth cube corner 404 useful in directing the third reference beam 325.

Figure 5:
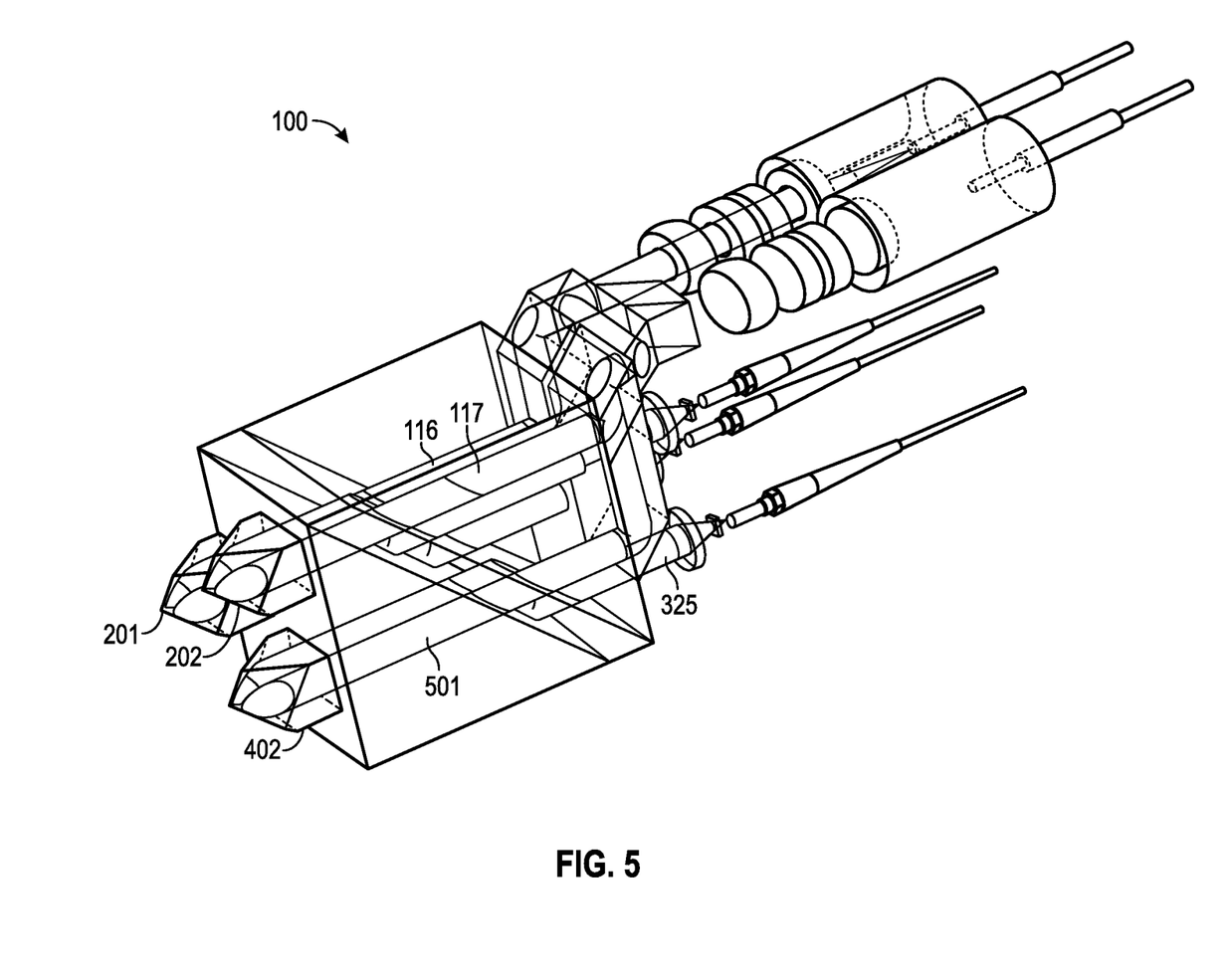
FIG. 5 is another perspective view of the interferometer of the representative embodiment of FIG. 1.

FIG. 5 is a perspective view of the interferometer of the representative embodiment of FIG. 1. All aspects and details of the apparatus 100 as described in connection with FIGS. 1-4 are substantively identical, and are generally not repeated in the description of FIG. 5.

The apparatus 100 of the representative embodiment depicted in FIG. 5 shows the optical paths of the first, second and third reference beams 116, 117, and 501. Notably, the measurement beams described above (and below) are not depicted in order to provide a clearer view of the paths of the various measurement and output beams. 501 and 402 are not shown in FIGS. 1,2,3.

Figure 6:
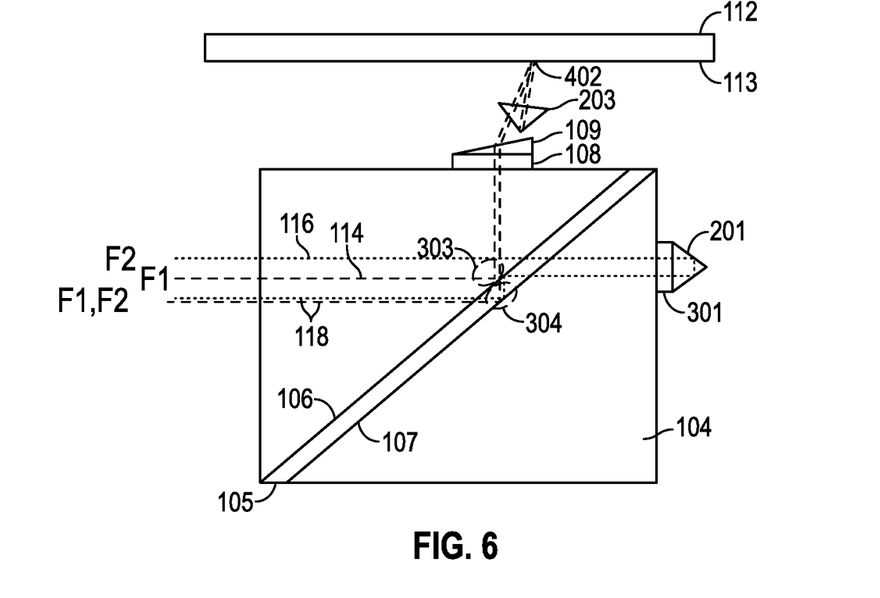
FIG. 6 is a simplified schematic cross-sectional view of a measurement optical path of an interferometer in accordance with a representative embodiment.

FIG. 6 is a simplified schematic cross-sectional view of a measurement optical path of apparatus 100 in accordance with a representative embodiment. Notably, the measurement optical path depicts the optical path for the first measurement beam 114, and the first reference beam 116. Of course, the measurement optical path for the second measurement beam 115 and the second reference beam 117 is similar.

All aspects and details of the apparatus 100 as described in connection with FIGS. 1, 2 and 3 are substantively identical, and are generally not repeated in the description of FIG. 4.

As shown, first measurement beam 114 is incident on first portion 303 of the first surface 106. This first portion 303 comprises the polarization beam splitter (PBS) provided thereover or formed thereon. The first measurement beam 114 has a first polarization and is reflected by the PBS at first portion 303. By contrast, the first reference beam 116 has a second polarization, which is substantially orthogonal to the first polarization. As such, the first reference beam 116 is transmitted substantially unreflected at the PBS of the first portion 303.

Upon reflection at the first portion 303, the first measurement beam 114 is incident on the first optical retarder 108, where it undergoes a quarter-wave ($\lambda/4$) rotation, and is directed toward the diffraction element 112 by the first directional element 109. The first measurement beam 114 is then directed toward at an angle described above, and is incident on the third cube corner 203. From the cube corner, the first measurement beam 114 and returned along its incident path back to the diffraction grating, is again diffracted, and is incident on the first directional element 109. The first measurement beam 114 again traverses the first optical retarder 108, where it undergoes another quarter-wave rotation. Upon incidence again on the PBS at first portion 303, the first measurement beam 114 has a polarization state rotated by 90° from its incident state. As such, the first measurement beam 114 is substantially unreflected at first portion 303 and travels through the optical element 105, and is incident on second portion 304 of the second surface 107. The second portion 304 has a beam bender formed on or otherwise disposed thereon. The beam bender is, for example, a highly reflective (HR) coating within the purview of one of ordinary skill in the art. Upon incidence at the second portion 304, the first measurement beam 114 is reflected to be a part of the first output beam 118.

The first reference beam 116 is transmitted substantially unreflected at the PBS of the first portion 303, and traverses the third optical retarder 301, which as noted above isoptional, and is reflected offset, but parallel to its incident path by the first cube corner 201. In the representative embodiment, traversing the third optical retarder 301 twice results in a polarization rotation of 90° from its incident state. As such, the first reference beam 116 has the first polarization state. Upon incidence at first portion 303, the PBS reflects the reference beam to second portion 304, where it is again reflected, and is combined with the first measurement beam to provide the first output beam 118 after reflecting at second portion 304 of second surface 107.

The representative embodiments described above are directed to measurements of displacement along the positive and negative axes of one coordinate axis. The present teachings are not so limited, and may be configured to provide data regarding displacements along more than one axis. Notably, multiple axes of measurement are implemented by additional pairs of measurement and reference optical beams and optical paths at different locations.

Figure 7:
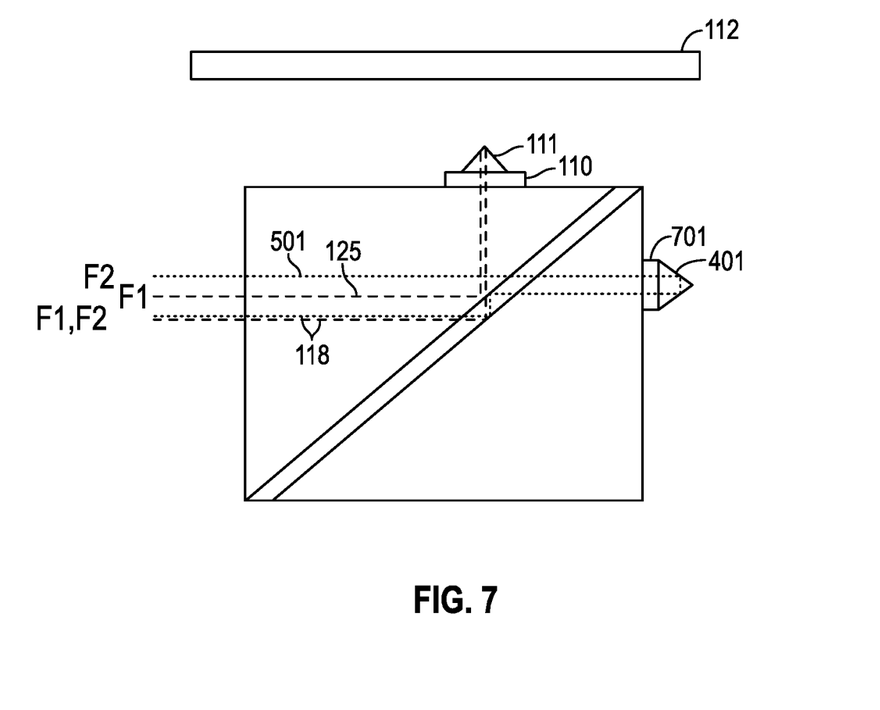
FIG. 7 is a simplified schematic cross-sectional view of a measurement optical path of apparatus in accordance with a representative embodiment.

FIG. 7 is a simplified schematic cross-sectional view of a measurement optical path of apparatus 100 in accordance with a representative embodiment. Notably, the measurement optical path depicts the optical path for the third measurement beam 125, and the third reference beam 501. These beams are known as the null beams and are used for calibration of the apparatus 100. The physics of the optical trajectories are substantively the same as those described above. Notably, an optical retarder 701 ($\lambda/4$ plate) can be provided, or may be omitted for the same reasons described above in connection with third and fourth optical retarders 301, 302.

While representative embodiments are disclosed herein, one of ordinary skill in the art appreciates that many variations that are in accordance with the present teachings are possible and remain within the scope of the appended claim set. The invention therefore is not to be restricted except within the scope of the appended claims.

The invention claimed is:
1. An apparatus comprising:
a first input configured to provide a first measurement beam at a first frequency, and a second measurement beam at the first frequency;

a second input configured to provide a reference beam at a second frequency that is different than the first frequency;

an optical element comprising a first portion comprising a polarization beam splitter;

a diffraction grating disposed over the optical element configured to diffract the first measurement beam and a second measurement beam;

a first directional element;

a first optical retarder disposed beneath the first directional element, the first optical retarder being configured to rotate a polarization axis of the first measurement beam by approximately 90°, wherein the first directional element is adapted to direct the first measurement beam to the diffraction grating;

a second optical retarder;

a second directional element disposed over the second optical retarder, the second optical retarder being configured to rotate a polarization axis of the second measurement beam by approximately 90°;

a third input configured to provide a third measurement beam at rst frequency. and a fourth measurement signal at the first frequency, wherein the third measurement beam traverses the second optical retarder, and is reflected back along or parallel to its original by the second directional element;

a fourth input configured to provide a reference beam at the second frequency that is different than the first frequency, wherein the optical element comprises a second portion comprising a polarization beam splitter, the diffraction grating configured to diffract the third measurement beam and a fourth measurement beam;

a third optical retarder disposed between the optical element and a first cube corner configured to rotate a polarization axis of a third optical beam by approximately 90°; and a fourth optical retarder disposed between the optical element and a second cube corner configured to rotate a polarization axis of a fourth optical beam by approximately 90°.

2. An apparatus as claimed in claim 1, wherein the optical element is an optical plate, and the first portion is disposed so that the first measurement beam is incident thereon upon initial incidence.

3. An apparatus as claimed in claim 1, wherein the optical element comprises a third portion disposed so the second measurement beam is incident thereon upon initial incidence.

4. An apparatus as claimed in claim 3, wherein the optical element comprises a fourth portion comprising a beam bender.

5. An apparatus as claimed in claim 4, wherein the second measurement beam, after twice traversing the first optical retarder, traverses the third portion, and is incident on the fourth portion where it is reflected.

* * * * *